Nov. 13, 1962

C. K. KELLEY 3,063,707

MACHINE SHOP VISE

Filed March 17, 1959

INVENTOR.
Charles K. Kelley
BY
Fred C. Matheny
ATTORNEY

Nov. 13, 1962  C. K. KELLEY  3,063,707
MACHINE SHOP VISE
Filed March 17, 1959  2 Sheets-Sheet 2

INVENTOR.
Charles K. Kelley
BY
Fred C. Matheny
ATTORNEY

United States Patent Office 3,063,707
Patented Nov. 13, 1962

3,063,707
MACHINE SHOP VISE
Charles K. Kelley, Fairbanks, Alaska
(P.O. Box 216, Fall City, Wash.)
Filed Mar. 17, 1959, Ser. No. 799,990
1 Claim. (Cl. 269—204)

My invention relates to a machine shop vise and general objects of my invention are to provide an improved vise which is particularly well adapted for holding work on which machining operations are being done, said vise being strong and durable in construction, reliable and efficient in operation, easy to manipulate, capable of a wide range of jaw adjustments, and capable of saving time and labor by making possible quick and easy adjustment of the jaws over a wide range to accommodate objects of widely varying size.

Another object is to provide novel and efficient means for quickly and easily attaching my vise securely to a table of a machine used in a machine shop, such as a drill press, planer, shaper or the like, said attaching means being very quickly and easily releasable.

Another object is to provide a machine shop vise having a fixed jaw, a movable jaw, and a twin screw mounting block, the movable jaw and twin screw mounting block both being adjustable along two side frame members which serve as tracks, the twin screw mounting block carrying two transversely spaced apart clamp screws and said block having novel and efficient means for locking it to and releasing it from the track forming side frame members.

Another object is to provide a machine shop vise having two track forming side frame members which are provided with ratchet teeth and are spaced apart to leave therebetween a clearance slot into which a driven tool may extend without contacting and damaging the track members.

Another object is to provide, in the fixed jaw of a vise of this type, a plurality of upright and horizontal work holding slots of V shape in cross section, the upright slots being of different sizes and being positioned so that work pieces in these slots will be clear of the frame and can rest on the machine table on which the vise is supported.

Other objects of my invention will be apparent from the following description taken in connection with the accompanying drawings.

In the drawings FIGURE 1 is an isometric view showing a machine shop vise constructed in accordance with my invention, the twin clamping screws and hold down means for the twin screw mounting block being omitted.

Like reference numerals refer to like parts throughout the several views.

Figures 1, 2:
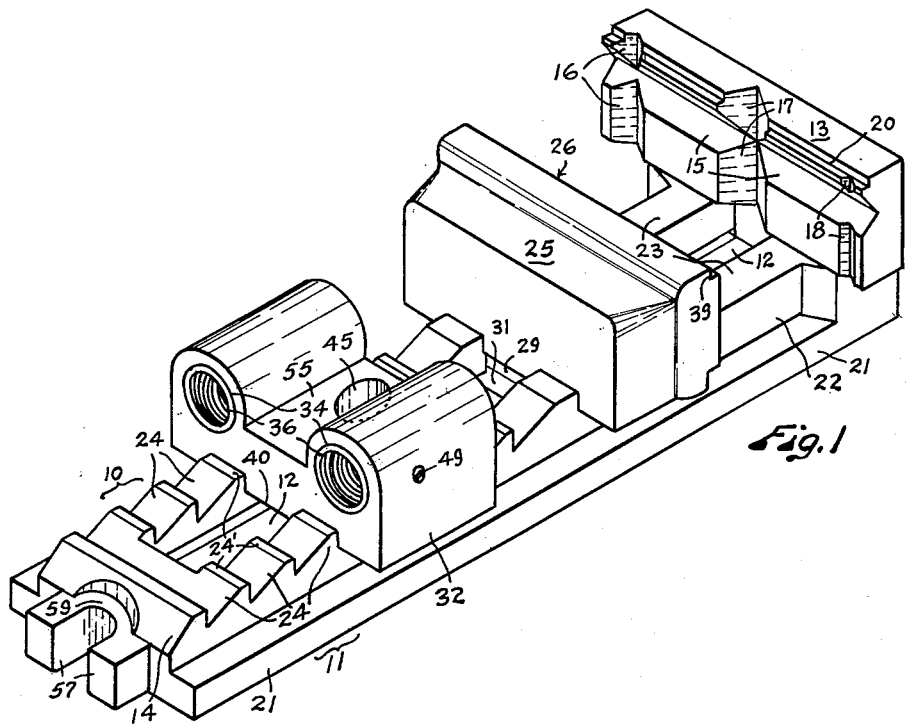
FIG. 2 is a top plan view of the complete vise showing the same secured on the table of a drill press or like machine.
Figure 3:
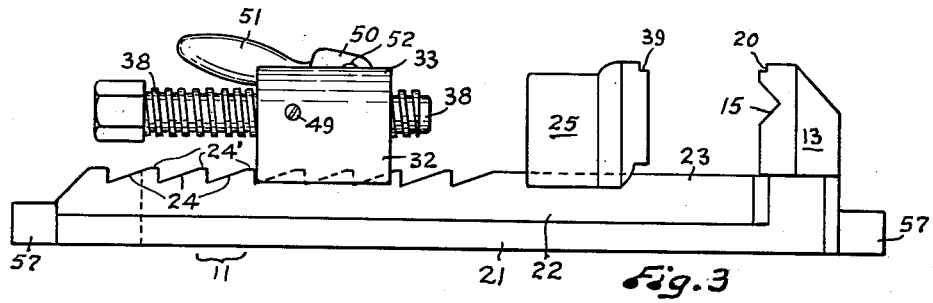
FIG. 3 is a side elevation looking in the direction of broken line 3—3 of FIG. 2 but with the table and anchor members attaching the vise thereto omitted.
Figure 4:
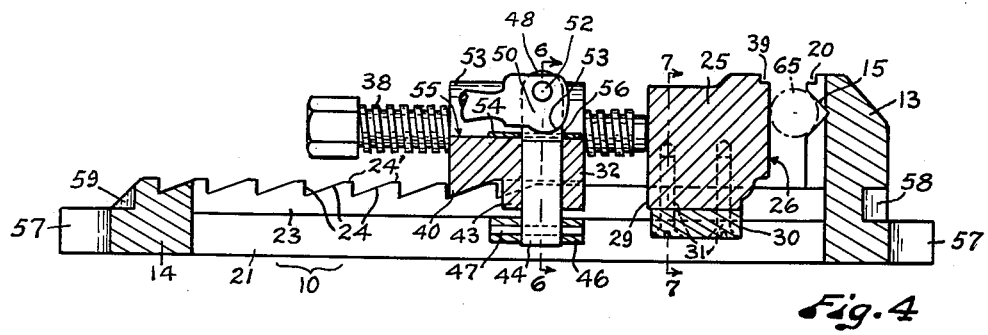
FIG. 4 is a longitudinal sectional view with parts in elevation and parts broken away taken substantially on broken line 4—4 of FIG. 2, the table being omitted.

This vise comprises a frame of approximately rectangular shape including two side frame members indicated generally by numerals 10 and 11. The side frame members 10 and 11 are spaced apart to leave a slot 12 of substantial width therebetween and said side frame members are connected with each other at one end by an integral or fixedly attached vise jaw 13 and at the other end by an integral end frame member 14.

The fixed jaw 13 is thick and strong and it extends a substantial distance above the side frame members 10 and 11. The inner face of said fixed jaw 13 is provided with preferably one horizontal V-groove 15 and preferably three upright V-grooves 16, 17 and 18 to facilitate holding work pieces. These grooves are of varying depth to accommodate work pieces of varying size. The upright V-grooves 16 and 18 are positioned near the ends of the fixed jaw 13 and outwardly from the side frame members 10 and 11 and the upright V-groove 17 is aligned with the slot 12. With the upright V-grooves thus positioned work pieces held in said upright grooves 16, 17 and 18 will be clear of the side frame members 10 and 11 and said work pieces can rest on the surface on which the vise is supported. Thus the work pieces can have a vertical support and longer work pieces can be accommodated. Also the upper corner of fixed jaw 13 is provided with an L shaped groove 20 to receive a flat work piece, as hereinafter explained.

Each side frame member 10 and 11 is shaped like a Z-bar in cross section and consists of an outwardly directed base flange 21, an upright web portion 22 and an inwardly directed upper track flange 23. Ratchet teeth 24 are provided on the top of each upper track flange 23. These ratchet teeth 24 extend from the end 14 of the frame approximately half way to the fixed jaw 13. The remaining portions of the track flanges 13 are preferably smooth on top. Preferably the tip portion of each ratchet tooth 24 has a narrow flat part 24' to minimize danger of damaging the tooth and to form a better support for parts which are movable thereover. The outwardly extending base flanges 21 serve as means with which anchor members 19 may engage to anchor this vise to a suitable support, as hereinafter explained.

A movable jaw 25 is supported on the upper track flanges 23. This jaw 25 is provided with a flat upright front face 26 which is positioned in opposed relation to the grooved inner face of the fixed jaw 13 for clamping cooperation therewith. The upper front corner of the movable jaw 25 has an L shaped groove 39 therein for cooperation with the L shaped groove 20 of the fixed jaw 13 in holding flat work pieces. The lower edge of the movable jaw 25 has two spaced apart transverse track grooves 27 and 28 between which is a downwardly extending integral guide part 29. The track grooves 27 and 28 fit over the track flanges 23 of frame members 10 and 11 and the guide part 29 extends between said track flanges 23. The movable jaw 25 is capable of operating on the toothed part of the flanges 23 and is thick enough so it will slide smoothy over the ratchet teeth 24 and will never rest upon less than two of the flat portions 24' of said ratchet teeth 24 when it is on the toothed parts of the flanges 23.

A hold down plate 30 is rigidly secured, preferably by four screws 31, to the bottom of the guide part 29 of the movable jaw 25. The end portions of the hold down plate 30 extend under the adjacent top flanges 23 in close relation to said flanges and hold the movable jaw 25 down on the flanges 23 while permitting free movement of said jaw 25 toward and away from the fixed jaw 13.

Figure 8:
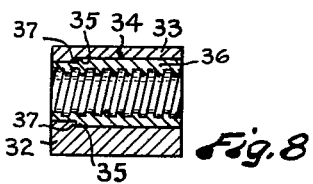
FIG. 8 is a sectional view on broken line 8—8 of FIG. 6 showing part of the twin screw mounting block, the screw being omitted.

A twin screw mounting block 32 is adjustably supported on the toothed portion of the track flange 23. The upper portion of the twin screw mounting block 32 is provided with two longitudinally extending spaced apart tubular screw carrying members 33. Each member 33 is bored as shown in FIG. 8 to provide therein a cylindrical passageway having a shoulder 35. An internally threaded bushing 36 having an external shoulder 37 is disposed within each passageway 34 and a clamp screw 38 is threaded through each bushing 36. The external shoulder 35 of each bushing 36 rests against one of the internal shoulders 37 and the thrust of the screw is borne by these shoulders. It has been found that if the shoulders 35 and 37 are positioned near the end of the screw mounting block 25 toward which the thrust is exerted, this being the end shown at the left in FIGS. 1 to 4 and 8, the bushings will be less liable to be broken at the location of the shoulders 35. Preferably a set screw 49 is threaded through the wall of each member 30 to jam against the adjacent bushing 36 and prevent its displacement.

Figure 9:
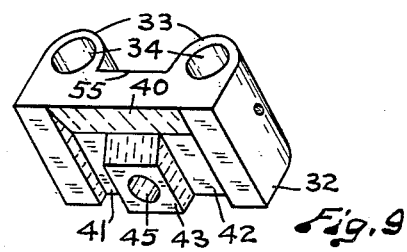
FIG. 9 is a detached perspective view showing the bottom of the twin screw mounting block, the screws and threaded bushings in said block being omitted.

The bottom of the screw mounting block 32 is shaped, as best shown in FIG. 9, to provide a transverse tooth member 40, two spaced apart longitudinally extending track grooves 41 and 42 to fit over track members 23, and a downwardly extending guide member 43. The guide member 43 is positioned between the grooves 41 and 42. The tooth member 40 is shaped so that it will interfit and engage with the ratchet teeth 24, the member 43 operates in the slot 12 and the grooves 41 and 42 ride on the track flanges 23 including the teeth 24.

Readily releasable clamp devices are provided for locking the screw mounting block 32 down on the frame members 10 and 11. These clamp devices comprise an upright clamping pin 44 movable in an upright bore 45 in the screw mounting block 32. The lower end of the pin 44 has a rigidly attached disc shaped head 46 which can be drawn tightly against the under sides of the top track flanges 23. The head 46 can be secured to pin 44 by a cross pin 47 but preferably it is rigidly welded to said pin 44 or is an integral part of the same. The clamping pin 44 terminates, at its upper end, in a flattened part 48 which fits between two side parts 50 of a forked cam lever 51 and is connected with said side parts 50 by a transverse pivot pin 52. Each side part 50 has a cam shaped edge 53 which is adapted to engage with a cam plate 54. The cam plate 54 is of generally rectangular shape and it lies on a flat upper surface 55 of the screw mounting block 32 between the tubular members 33. The flattened member 48 on the upper end of the clamping pin 44 extends through a slot 56 in the cam plate 54. This cam plate 54 overhangs parts of the bore 45 in the block 32 and provides an uninterrupted flat smooth bearing surface for the cam members 53 to contact. Also the cam plate 54 prevents the lever 51 from being turned away from its normal operating position and said cam plate is readily removable and can be replaced by a thicker plate to compensate for wear if desired.

Two spaced apart integral lugs 57 protrude from each end of the vise frame and serve as means with which bolts or like fastening devices can be engaged to secure the vise to any desired support. These lugs are useful when the vise is used on the table of a planer or shaper in which instance the vise must be accurately aligned. Preferably a recess 58 is provided in the outer side of the fixed jaw 13 just above the top plane of the lugs 57 to afford more room for the head or nut of any hold down device connected with these lugs and preferably a notch 59 is provided in the cross frame part 14 at the opposite end of the vise for the same purpose. The lugs 57 are also useful when this vise is used with a milling machine and in any instance where it is desirable to square the vise with the table on which it is used.

Figures 5, 6, 7:
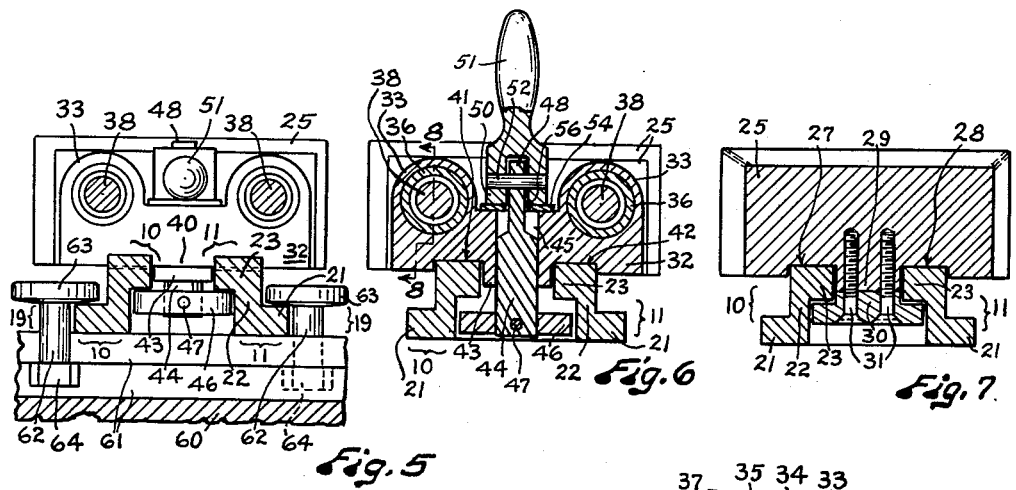
FIG. 5 is a cross sectional view with parts in elevation taken substantially on broken line 5—5 of FIG. 2 and showing a fragment of the table and anchor means securing the vise thereto.
FIG. 6 is a cross sectional view on broken line 6—6 of FIG. 4 but showing the cam operated hold down means for the twin screw mounting block in a released position.
FIG. 7 is a cross sectional view on broken line 7—7 of FIG. 4 showing a movable vise jaw.

When my vise is used in connection with a drill press the previously mentioned anchor members 19 are quickly and easily applied or detached and are highly efficient in securing the vise to a drill press table 60 of the conventional type illustrated in FIGS. 2 and 5. Such tables 60 have in their upper sides slots 61 of inverted T shape and of standard dimensions commonly called T-slots. These T-slots extend across the table from one end or edge to the other, are open at their ends and facilitate securing work to the table. Each anchor member 19 comprises a cylindrical shank 62 having on one end an integral head 64 similar to an ordinary bolt head and having on the other end an integral disc shaped head 63 of substantially larger radial dimension than the head 64. The head 64 is capable of entering into one of the slots 61 of table 60. The under side of the disc shaped head 63 is slightly convexly coned and is adapted to extend over and tightly engage with a base flange 21 of the vise. Two of the anchor members 19 applied to opposite sides of the vise, as shown in FIG. 2 and tightened on the base flanges 21 by exerting a clockwise twist or torque on the vise will ordinarily securely anchor the vise to the drill press table 60. Usually the torque exerted by a drill applied to work held in the vise will be in a clockwise direction, downwardly considered, and this will further tend to tighten the anchor members 19 on the base flanges 21 of the vise. Also these anchor members 19 can be tapped with a hammer or like tool in tightening or loosening them. In FIG. 2 the vise is shown as extending crosswise of the slots 61 in the table 60 but it will be understood that said vise will usually be in a position at an angle to these slots or may even be substantially parallel to said slots. The anchor members 19 provide a very quick and easy means for anchoring my vise to a slotted table and it is to be noted that the vise jaws and the twin screw mounting block 32 are all above and clear of the heads 63 of these anchor members.

In using this vise both the movable jaw 25 and the twin screw mounting block 32 and parts carried thereby can be very quickly and easily moved in either direction along the frame to adjust them into approximately the clamping positions required by a piece of work of given size before the clamping screws 38 are used. Said screws can then be used to complete the clamping of the work with a minimum amount of turning movement. In this way my vise makes possible a saving in time and labor. The V-grooves 15, 16, 17 and 18 in the clamping face of the fixed jaw 13 provide more secure holding of small work pieces, particularly cylindrical pieces such as the work piece 65 shown by dot and dash lines in FIG. 4. The twin screws 38 are capable of exerting a powerful thrust, which is exerted near the two side edges of the movable jaw 25 so that there is little tendency for the movable jaw to twist even though the work is not centered between the two jaws. For instance, these twin screws 38 make it possible to securely grip a work piece either in the upright notch 16 or the upright notch 18 of the fixed jaw 13 without subjecting the movable jaw to an undesirable twist or cocking the same out of shape.

If a flat piece of material with fairly straight edges is to be worked on it can be laid in the corner grooves 20 and 39 so that it will be vertically supported from below along both edges and it can further be clamped for horizontal support.

The foregoing description and accompanying drawings clearly disclose a preferred embodiment of my invention but it will be understood that this disclosure is merely illustrative and that changes may be made within the scope of the following claim.

I claim:

In a machine shop vise and table and anchor member combination, a machine shop table having spaced apart upwardly opening T-slots extending to at least one edge of the table, a generally rectangular vise frame having outwardly projecting lateral base flanges resting on the table when the vise is on the table; at least two one-piece spaced apart anchor members capable of being engaged with said table on opposite sides of said vise and extending above the table, each anchor member comprising a shank perpendicular to the table when engaged with the table and extending into one of the T-slots of said table; a bolt type head rigid with the lower end of said shank and positioned within the wider part of a T-slot in the table securing the anchor member to the table; a relatively thin disc shaped head of large diameter rigid with the upper end of said shank capable of extending over and engaging with a base flange of said vise frame, the under side of said disc shaped head being convexly tapered, the maximum distance between the two heads of each anchor member being greater and the minimum distance between said two heads being less than the combined thickness of the base flange of the vise frame and the overhanging lip of the T-shaped table slot in which the anchor member operates, whereby the vise can be secured to the table by positioning it between two anchor members supported in T-slots and imparting to the vise a twisting movement in wedgingly engaging the outwardly extending base flanges of the vise frame under the convex under sides of the uppermost heads of said anchor members.

References Cited in the file of this patent

UNITED STATES PATENTS

| | | |
|---|---|---|
| 16,506 | Wheeler | Jan. 27, 1857 |
| 164,934 | Taft | June 29, 1875 |
| 497,072 | Iles | May 9, 1893 |
| 545,895 | Jordan | Sept. 10, 1895 |
| 827,230 | Goeppinger | July 31, 1906 |
| 893,875 | Schneider | July 21, 1908 |
| 1,120,649 | Deleeuw | Dec. 8, 1914 |
| 1,249,207 | Ruff | Dec. 4, 1917 |
| 1,303,205 | Johnson | May 6, 1919 |
| 2,063,899 | Wells | Dec. 15, 1936 |
| 2,148,156 | Hagopian | Feb. 21, 1939 |
| 2,411,790 | Hadley | Nov. 26, 1946 |
| 2,430,366 | Porterfield | Nov. 4, 1947 |
| 2,491,559 | Hargrett et al. | Dec. 20, 1949 |

FOREIGN PATENTS

| | | |
|---|---|---|
| 266,180 | Switzerland | Apr. 17, 1950 |